(12) United States Patent
Vandevoorde et al.

(10) Patent No.: US 9,377,523 B2
(45) Date of Patent: Jun. 28, 2016

(54) DETERMINING WIRELESS ACCESS POINT LOCATIONS USING CLUSTERED DATA POINTS

(71) Applicant: Google Inc., Mountain View, CA (US)

(72) Inventors: Mark Vandevoorde, Mountain View, CA (US); Arunesh Mishra, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 343 days.

(21) Appl. No.: 13/913,214

(22) Filed: Jun. 7, 2013

(65) Prior Publication Data

US 2015/0186506 A1    Jul. 2, 2015

Related U.S. Application Data

(60) Provisional application No. 61/657,314, filed on Jun. 8, 2012.

(51) Int. Cl.
*G06F 17/30* (2006.01)
*G01S 5/02* (2010.01)

(52) U.S. Cl.
CPC .............. *G01S 5/0284* (2013.01); *G01S 5/0242* (2013.01); *G06F 17/30705* (2013.01)

(58) Field of Classification Search
CPC ............ G06F 17/30705; G01S 5/0284; G01S 5/0242; G01S 17/30705
USPC .......................................... 707/737, E17.089
See application file for complete search history.

(56) References Cited

U.S. PATENT DOCUMENTS

| | | | | |
|---|---|---|---|---|
| 8,451,771 | B2 * | 5/2013 | Hedayat | H04W 74/0816 370/322 |
| 8,817,756 | B1 * | 8/2014 | Hart | H04W 74/04 370/337 |
| 2006/0268823 | A1 * | 11/2006 | Kim | H04W 72/005 370/349 |
| 2011/0274037 | A1 * | 11/2011 | Jain | H04W 8/085 370/328 |
| 2013/0223308 | A1 * | 8/2013 | Chandra | H04W 52/0229 370/311 |

* cited by examiner

*Primary Examiner* — Phong Nguyen
(74) *Attorney, Agent, or Firm* — Marshall, Gerstein & Borun LLP

(57) ABSTRACT

A method for determining the location of a wireless access point is described Location data points are collected from a plurality of mobile devices associated with a particular access point. The collected location data points are organized into at least two clusters. The location data points are further grouped into sessions based on a characteristic of the location data points. A rank qualifier is applied to each of the organized clusters. The location of the wireless access point is determined based on one or more of the organized clusters.

25 Claims, 6 Drawing Sheets

DETERMINING WIRELESS ACCESS POINT LOCATIONS USING CLUSTERED DATA POINTS

CROSS REFERENCE TO RELATED APPLICATIONS

This application claims the benefit of U.S. Provisional Application No. 61/657,314, filed Jun. 8, 2012, entitled "Determining Wireless Access Point Locations Using Clustered Data Points", which is incorporated herein in its entirety by reference,

BACKGROUND

1. Field

Embodiments relate to determining the location of a wireless access point via data received from mobile devices.

2. Background

Cataloging the location of wireless access points is important for the use of several mobile applications. Existing approaches to estimating the location of a wireless access point can be time consuming and inaccurate. One approach uses detailed measurements of distance and signal strength. Other approaches do not require detailed measurements, but are subject to significant inaccuracies.

BRIEF SUMMARY

Systems and methods for determining the location of an access point while substantially reducing erroneous data points are provided.

An example method performed by a computer connected to a network is described. The computer receives a plurality of location data points from a plurality of mobile devices associated with a wireless access point. The plurality of location data points are organized into at least two clusters. The location data points of an organized cluster are further organized into one or more sessions based on a characteristic of the location data points. A rank qualifier is applied to each of the organized clusters. The location of the wireless access point is determined based on the organized clusters.

In an embodiment, a networked computer system includes a receiver, a clusterer a rank applier and a location determiner. The receiver is configured to receive a plurality of location data points from a plurality of mobile devices associated with a wireless access point. The clusterer is configured to organize the plurality of location data points into at least two clusters, and group received location data points of an organized cluster into a session based on a characteristic of the location data points. The rank applier is configured to apply a rank qualifier to each of the clusters. The location determiner is configured to determine a location of the wireless access point based on at least one of the organized clusters.

In another embodiment, a computer readable storage medium contains instructions executed by a computing device to perform the method described above for determining the location of a wireless access point.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the relevant art(s) given the description herein, to make and use the invention.

Figure 1:
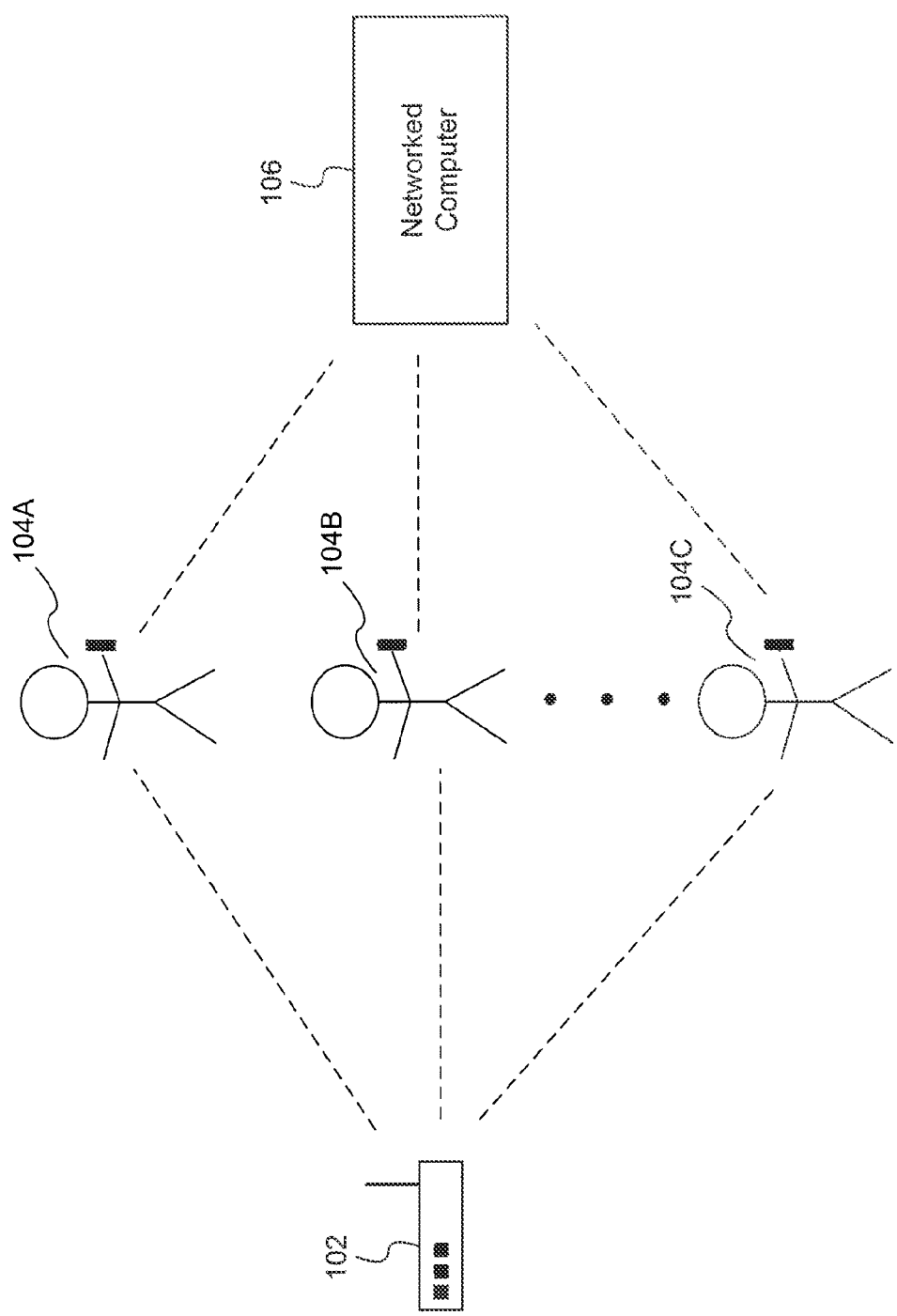
FIG. 1 is a diagram illustrating a network between a plurality of mobile devices, an access point, and a networked computer, according to an embodiment.

Embodiments will be described with reference to the accompanying drawings.

DETAILED DESCRIPTION

The following detailed description of the present invention refers to the accompanying drawings that illustrate example embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is explanatory and is intended to provide further examples and explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one having skill in the relevant art(s) given the description herein to effect such feature, structure, or characteristic in connection with other embodiments, whether or not explicitly described.

It would be apparent to one having skill in the relevant art(s) given the description herein, that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Overview

In an embodiment, determining the location of a wireless access point involves the collection of data from a plurality of mobile devices within signal range of the access point. When collecting data from a plurality of mobile devices within signal range of the access point, not all location data points collected provide accurate information regarding, for example, the location of the mobile device or the range from the access point. Such erroneous location data points can make the determination of the access point location more difficult.

Errors in the data may result for a variety of reasons. Many times the GPS chipset within a mobile device computes a location with a significant amount of error. This can happen when the mobile device does not have a spatially unbiased view of the satellites in the sky. For example, a mobile device close to a window within a building can communicate with more satellites in the direction of the sky visible from the window. This results in the GPS chipset computing the location to be outside the building in the direction of the view of the sky from the window. Another source of error stems from the listing of wireless access points in a wireless scan. Wireless chipsets and device drivers "cache" access points for fast scanning and other technical reasons. As a result, when they return scan data, they might include "cached" access points that were visible at an earlier time and location. For example, access points that were visible at a location A might get paired up with a scan computed at a location B. This causes significant error when such location data is aggregated on a per-access point basis.

To improve accuracy, in an embodiment, a method is performed to organize the collected location data points into clusters based on the distances between each of the location data points. Once clustered, the highest one or more ranked clusters may be chosen to determine the location of the access point. In one example, a rank is assigned to a cluster based on the number of sessions present within the cluster. The location of the access point may be determined with a certain confidence after a threshold amount of location data points have been collected from enough mobile devices.

FIG. 1 illustrates an example data collection network 100 according to an embodiment of the invention. In an example, data collection network 100 includes a wireless access point 102, a plurality of mobile devices 102A-C (with their associated users), and a networked computer 106.

Mobile devices 102A-C each wirelessly communicate with access point 102. This wireless communication between mobile devices and an access point may be associated with a measured signal strength. As would be appreciated by one having skill in the relevant art(s) given the description herein, based on a measured signal strength, a wireless propagation model can be used to estimate a distance between each mobile device 102A-C and access point 102. Furthermore, in certain circumstances, mobile devices 102A-C may be able to communicate with a global positioning system (GPS) to receive data related to their geolocation. It should be understood that although FIG. 1 only illustrates three mobile devices 102A-C, any number of mobile devices may be utilized within data collection network 100.

In an embodiment, data related to the signal strength associated with a mobile device and access point 102 coupled with data related to the geolocation of the mobile device is collected from one or more of mobile devices 104A-C within signal range of access point 102. In an embodiment, this data is transmitted to networked computer 106 where the data is used to determine the location of access point 102. Once a location for access point 102 has been determined, the location may be stored in a database for use with any future applications executed by either networked computer 106 or any of mobile devices 104A-C. The transmission to networked computer 106 may occur directly from any of mobile devices 104A-C or via access point 102. It should be understood that the data associated with access point 102 may be repeatedly transmitted from each mobile device 104A-C for as long as that mobile device is in range of access point 102. For example, if mobile device 104A is in signal range of access point 102 for one hour, then signal strength data coupled with geolocation data may be transmitted to networked computer 106 every 10 seconds, providing around 360 location data points from mobile device 104A within the one hour time frame.

As would be appreciated by one having skill in the relevant art(s) given the description herein, all wireless signals described within data collection network 100 may be transmitted via any means, or combination thereof. Example communication methods include, but are not limited to, WiFi, Bluetooth, 3G, 4G, etc. It is to be understood that wireless transmission over long distances may be achieved by the signal first being received by a closest one or more cell towers (not shown) for routing the data to or from either networked computer 106 or any mobile device. Data collection network 100 can include any network such as the Internet, a wide area network, wireless network, telephone network, or local area network.

Networked computer 106 may include one or more standalone computers, a server, a server farm, or a cloud-computing server. The mobile devices can include smartphones, tablet computers, personal digital assistants, or similar mobile communications devices that can connect to networked computer 106 using a communications interface. The mobile devices may be devices that are frequently carried by the users. The communications interface can include an interface such as Bluetooth, Universal Serial Bus (USB), WiFi, or other interface by which a mobile device communicates with a networked computer. In an embodiment, a mobile device may be any device with the ability to wirelessly send and receive data.

Figure 2:
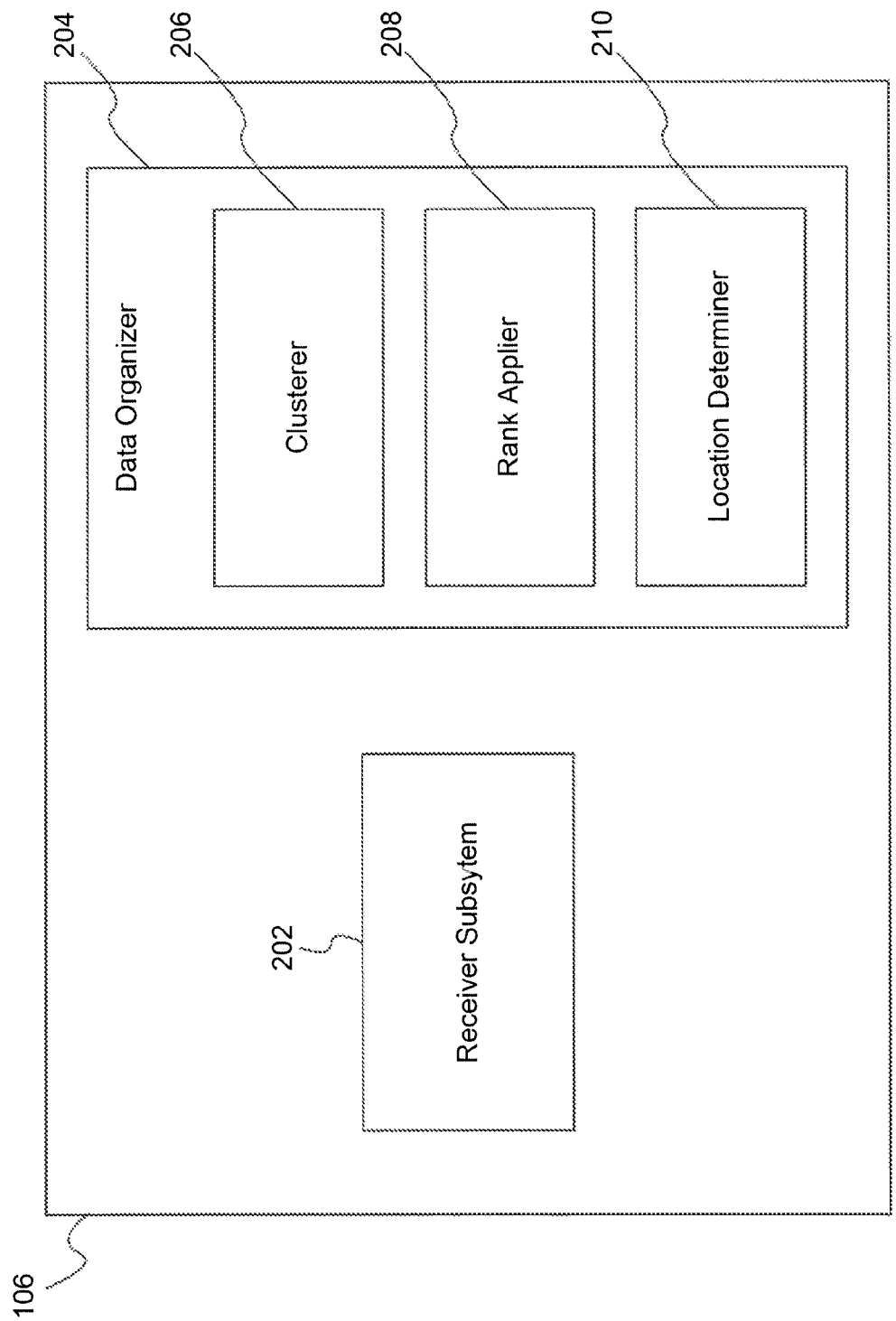
FIG. 2 illustrates a more detailed diagram of the networked computer, according to an embodiment.

FIG. 2 illustrates a more detailed view of networked computer 106 from data collection network 100. In an embodiment, networked computer 106 includes a receiver subsystem 202 and a data organizer 204. Data organizer 204 includes a clusterer 206, a rank applier 208, and a location determiner 210. It should be appreciated that other modules within data organizer 204 may be included beyond those illustrated in FIG. 2 without deviating from the scope of the invention.

In an embodiment, receiver subsystem 202 is configured to receive a plurality of location data points from mobile devices 104A-C associated with access point 102. As would be appreciated by one having skill in the relevant art(s), given the description herein, receiver subsystem 202 may include any component for the purpose of receiving and/or modulating data including, but not limited to, antennas, analog to digital converters, digital to analog converters, low pass filters, band pass filters, oscillators, multiplexers, demultiplexers, etc. Furthermore, receiver subsystem 202 may include one or more interfaces to access wired or wireless networks such as Ethernet network and WiFi networks, and/or one or more interfaces such as USB and Bluetooth to couple proximately located devices.

In an embodiment, data organizer 204 is configured to utilize the collected location data points from receiver subsystem 202 to determine a location of access point 102. The functions performed by clusterer 206, rank applier 208, and location determiner 210 of data organizer 204 are described with respect to FIGS. 3-5 below.

Location Data Points

Figure 3:
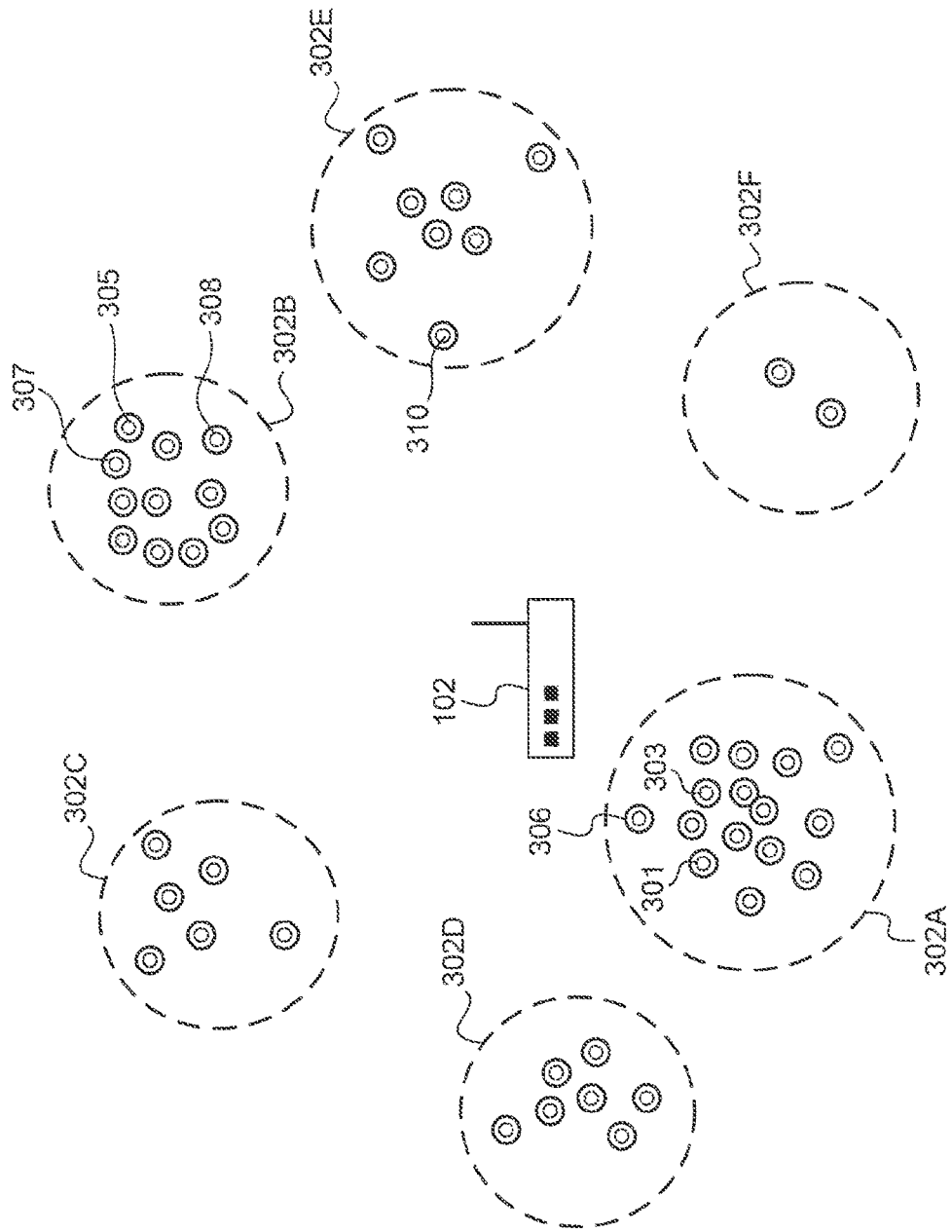
FIG. 3 illustrates collected location data points organized into clusters, according to an embodiment.

FIG. 3 illustrates an example plurality of location data points collected from a plurality of mobile devices 104A-C surrounding access point 102. The plurality of location data points are grouped into clusters 302A-F. Clusters 302A-F can be characterized by an embodiment, including labeling some as "strong" clusters and some as "weak" clusters, based on a number of location data points within each cluster.

Clustering Location Data Points

As shown in FIG. 3, location data points can be grouped into clusters based on a sharing of similar distance characteristics. For example, location data point 301 was collected from a location that is close to the collected locations of location data points 303 and 306. The relatively short distance between location data points 301, 303, and 306 is used to determine that the location data points 301, 303, and 306 should belong to the same cluster 302A. Other location data points may be included within cluster 302A as illustrated based on the short distances between each of the location data points associated with cluster 302A. in another example, location data point 305 is collected near location data points 307 and 308. Each of location data points 305, 307, and 308 are close to one another, but far from location data points 301, 303 and 306. Therefore, location data points 305, 307 and 308 would not belong in the same cluster as location data points 301, 303, and 306, but instead would be associated with their own cluster 302B.

Following from the examples above, the plurality of location data points associated with access point 102 are grouped within clusters 302A-E. In one embodiment, every location data point belongs to a cluster. For example, cluster 302A is formed by each of 15 location data points, which include location data points 301, 303, and 306, due to their relatively short distances between each other compared to the distances to other location data points found in other clusters 302B-E.

In another embodiment, using a different clustering approach, each newly received location data point is considered to belong to the closest cluster. The distance to a given cluster is the distance to the centroid of all the location data points within that cluster. For example, location data point 310 is the most recently received data point amongst the plurality of location data points illustrated. In this scenario, location data point 310 would be associated with cluster 302E as the centroid of cluster 302E is the shortest distance away from location data point 310 compared to the centroid of clusters 302A-D and 302F.

As would be appreciated by one having skill in the relevant art(s), different approaches can be used to cluster location data points in to clusters 302A-F. For example, organizing each location data point into a cluster may be performed using a Min-k clustering algorithm executed by clusterer 206 within networked computer 106. It should be understood that all or part of the clustering operations of clusterer 206 may also be performed by a mobile device 104A-C associated with access point 102. Other clustering algorithms may also be considered, including, but not limited to, hierarchical clustering, distribution-based clustering, etc.

In other embodiments, using different clustering approaches, other distance relationships can be used as well to organize location data points into various clusters. One example may involve forming clusters based on a distance of each location data point from access point 102. Another example may utilize clusters that are formed based on a distance of each location data point from an arbitrary location different from that of access point 102.

In another clustering approach used by an embodiment, location data points are formed into clusters based on a parameter different than distance. For example, clustering location data points can be based on the acquisition time of each location data point. In such an example, location data points collected within a certain time period of one another may be considered part of the same cluster. Focusing back on FIG. 3, location data points 301, 307, and 310 may be grouped into the same cluster based on acquisition time if each location data point was collected contemporaneously, even though each of location data points 30 and 310 are not proximally located.

Sessions

Once collected and clustered, location data points are further organized into sessions.

A session is a set of location data points that have been repeatedly transmitted from a single mobile device. In one approach, session determination can be based on identifier information associated with a location data point. For example, a location data point may have a mobile device identifier that specifies from which mobile device 104A-C the data was collected from. Location data points may be organized into a session based on the mobile device identifier.

In another embodiment, session determination is based on location characteristics of the location data points. For example, location data points tightly located around a central point may be considered to be organized into a session. The tightly packed pattern of many location data points may arise from various circumstances, such as users standing in a line to enter a theatre or users all sitting closely together at the same table in a restaurant. Other location characteristics beyond tightly packed location data points could be employed as well for organizing the points into a session as would be understood by one having skill in the relevant art(s) given the description herein.

Figure 4A:
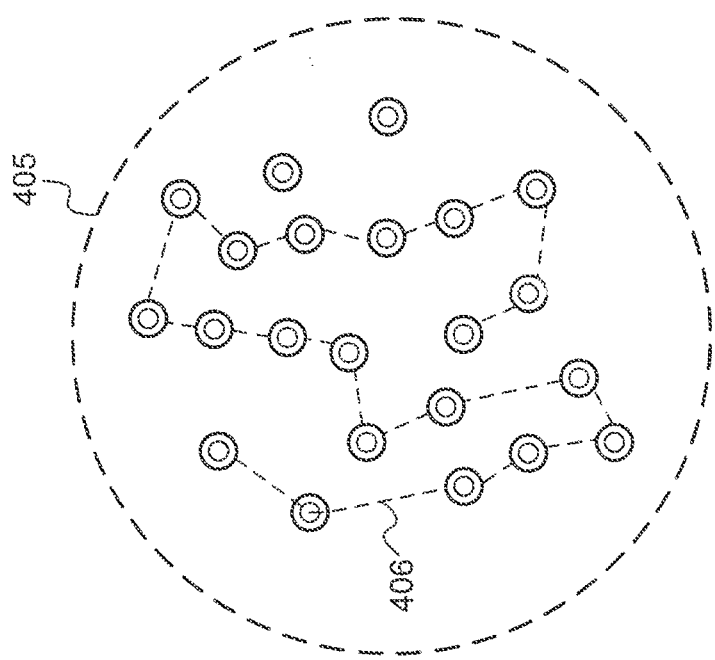
FIGS. 4A and 4B illustrate associating sets of location data points as sessions within a cluster, according to an embodiment.
Figure 4B:
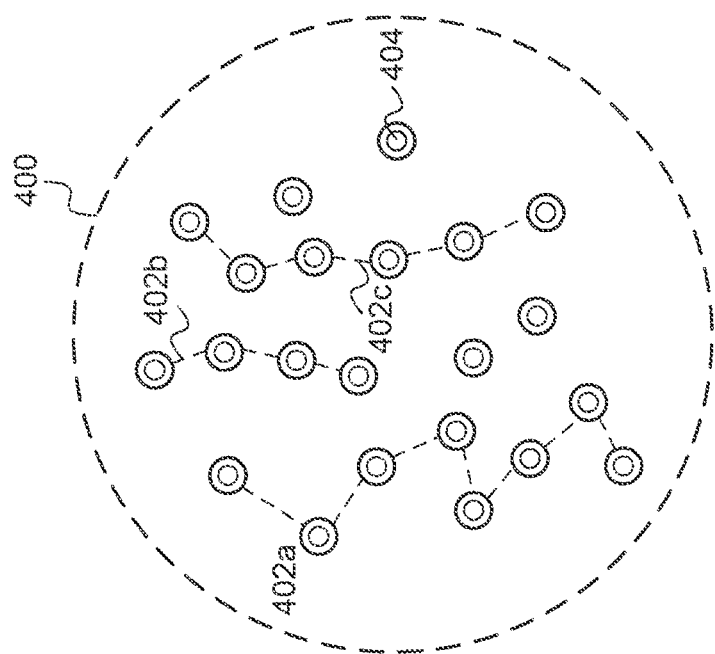

Graphical representations of example sessions within a cluster are shown in FIG. 4A and FIG. 4B. FIG. 4A illustrates an example of a first cluster 400 containing 22 location data points. The location data points have been further organized into sessions 402A-C. Each session may include location data points that have been transmitted from a single mobile device as described above (having a same mobile device identifier). For example, each location data point within a single session may have been collected one (1) second apart from the same mobile device. Also, it is possible that location data points can "stack" in a particular location. Stacked location data points may represent a stationary mobile device repeatedly transmitting the same location over a period of time. A stack of location data points such as that described may also constitute a session. The pattern of location data points collected from a single mobile device may be considered to be movement characteristics of those location data points.

Each of the three sessions 402A-C illustrated within first cluster 400 include various numbers of location data points in random location patterns. The illustrated sessions 402A-C may each represent the path of a walking user of a mobile device 104A-C repeatedly transmitting its location.

Location data point 404 is not associated with any particular session. The lack of association with any session may be indicative of an erroneous data point. In another example, each of any individual location data points similar to location data point 404 may be grouped into one or more sessions.

FIG. 4B illustrates an example of a second cluster 405 of location data points similar to those illustrated in first cluster 400, but with a single large session 406 rather than smaller sessions 402A-C. The location data points within session 406 may be associated as part of session 406 for any of the same, or similar, reasons discussed above regarding sessions 402A-C.

Cluster Ranking

One approach used by embodiments to reduce the number of errors in collected data is to selectively disregard certain collected location data points. One approach to selectively disregarding certain location data points is to disregard all data points within certain, selected clusters. Only data within the selected clusters are used for determining the location of access point 102. The data in any of the clusters not selected is disregarded when determining the location of access point 102. Utilizing only the location data points within the selected clusters may minimize the use of erroneous location data points. Thus, a decision is made on which clusters to use for determining the location of access point 102. In one embodiment, a ranking system is employed to rank the clusters based on certain criteria.

To selected certain clusters for use determining the estimated location of wireless access point 102, an embodiment first ranks the selected clusters then selects clusters for use based on the applied cluster rank.

The clustering technique aims to reduce the use of such erroneous location data points by computing the location of an access point from those points within a highest ranked cluster, according to an embodiment. In another embodiment, the location is computed from points within two or more highly ranked clusters. A rank qualifier may be applied to each cluster 302A-F based on the number of location data points present in the cluster. In another example, clusters 302A-F may be ranked based on when the location data points were collected, wherein the cluster with the highest rank has the most recently collected location data points. In yet another example, clusters 302A-F may be ranked based on how closely the collection frequency of location data points matches known access points in a similar environment (same neighborhood, an inner city region, etc.)

In an embodiment, a rank qualifier may be applied to a cluster based on a measure of session diversity within that cluster. Session diversity may be defined in a number of different ways. In one example, session diversity relates to the number of sessions present within the cluster. In such an example, cluster 400 would have a higher session diversity than cluster 405 since there are three sessions 402A-C in cluster 400 and only one session 406 in cluster 405. Therefore, cluster 400 would rank higher than cluster 405 in this example.

In another example, session diversity may relate to the size of each session within the cluster. The size of the session is determined by the number of location data points within the session. In such an example, cluster 405 would have a higher session diversity than cluster 400 since the session 406 within cluster 405 is larger than any of the sessions 402A-C within cluster 400. Therefore, cluster 405 would rank higher than cluster 400 in this example.

The process of applying rank qualifiers to one or more clusters, such as cluster 400 or cluster 405, may be executed by rank applier 208 within networked computer 106.

The individual location data points may also be assigned a weight between 0-1. In an embodiment, the weight is indicative of a "confidence" in how accurate the data point is or how accurately the data point captures the relationship between various access points in the wireless scan. The weight may further indicate how well a data point captures the location of the scan. Thus, instead of "counting" the number of data points within a cluster, a weighted sum of the individual weights may be used as a confidence score.

Other factors that may be considered for computing the confidence value of a single data point include (i) aggregate error properties of a phone platform (some phone hardware might have higher bias/error in the WiFi/GPS data), (ii) error patterns observed across software versions, or location specific biases in the data points, and (iii) user-specific error patterns, e.g., certain users might have a higher error bias due to the nature of the phones or bugs in their phones/software. These other factors are presented as examples and are not meant to be limiting. An assigned weight may be used in the next stage when computing a location.

Determining a Location Based on Selected Location Points

Once an embodiment has selectively disregarded certain collected location data points, the location of the wireless access point can be determined by different approaches. Using one approach, a probability map for the location of the wireless access point is constructed based on the data points. In this approach, both GPS location data and wireless signal strength data are associated with each location data point. Both the GPS and wireless data may be used to estimate the distance that each location data point is from access point 102. The estimated distance can produce a probability map for the location of access point 102 extending radially out from the location data point. Overlapping probability maps may be constructed for each of the location data points within the one or more selected clusters. After comparing each probability map, a region with the highest probability may be chosen as the estimated location for access point 102. In one example, the estimated location for access point 102 has a higher reliability with the existence of fewer erroneous location data points. In another example, the estimated location for access point 102 has a higher reliability when comparing probability maps of a greater number of location data points. An example of a similar approach to determining the location of an access point can be found in U.S. Provisional Patent Application No. 61/525,100 filed on Aug. 18, 2011, entitled "Probabilistic Estimation of Location Based on Wireless Signal Strength" which is incorporated by reference herein in its entirety, although embodiments are not limited to this example.

Other techniques may be utilized as well for estimating the location of access point 102 based on the selected portion of location data points. For example, a triangulation determination may be performed between sets of the selected location data points to determine a centroid location. An estimated location of access point 102 may be determined by comparing the various centroid locations.

Method 500

Figure 5:
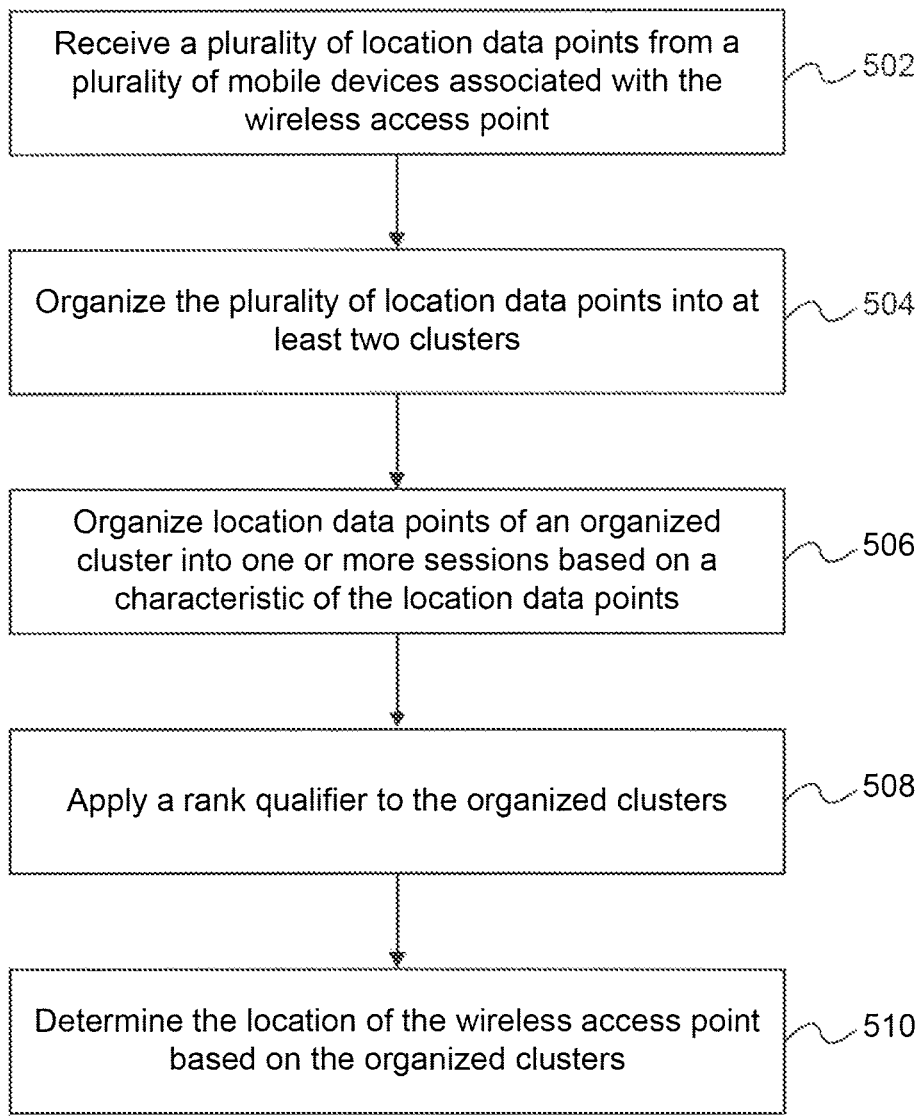
FIG. 5 is a flowchart showing a method for determining the location of an access point, according to an embodiment.

FIG. 5 illustrates an example method 500 for determining the location of access point 102, according to an embodiment. In one example, the method is performed by various components within networked computer 106.

In block 502, location data is received from a plurality of mobile devices 104A-C associated with wireless access point 102. It should be understood that the location data may be repeatedly transmitted from each mobile device 104A-C and received by networked computer 106. The location data may include any of GPS data, wireless signal strength (RSSI) data associated with wireless access point 102, a time that the data was collected, or an encrypted identifier of the mobile device 104A-C transmitting the location data.

In block 504, each collected location data point is organized into at least two clusters. The organization may be performed using a clustering algorithm, for example, a Min-k clustering algorithm based on distances between the collected data points. Specifics regarding the clustering process have been previously discussed.

In block 506, the location data points of an organized cluster are further organized into one or more sessions based on a characteristic of the location data points. As explained previously, sessions may be formed based on grouping location data points that share a mobile device identifier. In another example, sessions are formed based on location characteristics of the location data points.

In block 508, a rank qualifier is applied to each of the organized clusters. The rank qualifier may be based on a measure of session diversity within each cluster. The measure of session diversity may be determined by comparing parameters between various sessions from different clusters, for example, comparing the size of one session to another, or comparing the number of sessions within a cluster to the number of sessions within another cluster.

Alternatively, rank qualifiers may be applied based on criteria not related to sessions. For example, clusters can be ranked based on the total number of location data points within the cluster. The cluster with the highest number of location data points could receive the highest rank. In another example, clusters are ranked based on which cluster contains the most recent location data points. The cluster with the most recent readings could receive the highest rank.

In block 510, the location of access point 102 is determined based on the organized clusters. At least a portion of the location data points within one or more of the organized clusters is used for the determination, according to an embodiment. In an embodiment, only location data points within the highest ranked cluster are selected for determining the location of access point 102. In another embodiment, location data points within two or more of the highest ranked clusters are selected. It should be appreciated that any number of clusters may be selected, though it is preferable to select amongst the highest ranked clusters to help minimize the use of erroneous location data points. In an example, the portion of location data points used to determine the location of access point 102 contains a substantially reduced percentage of erroneous data points compared to the percentage of erroneous data points within all of the received location data points associated with access point 102. In another example, the portion of location data points used to determine the location of access point 102 contains substantially no erroneous data points.

It should be understood that method 500 may be stored as instructions on a computer readable storage medium and executed by a processor. As would be appreciated by one having skill in the relevant art(s) given the description herein, any computer readable storage medium may be used, including, but not limited to, RAM, flash memory, electronically erasable programmable read-only memory (EEPROM), hard disk drive, etc.

Example Computer System Implementation

Figure 6:
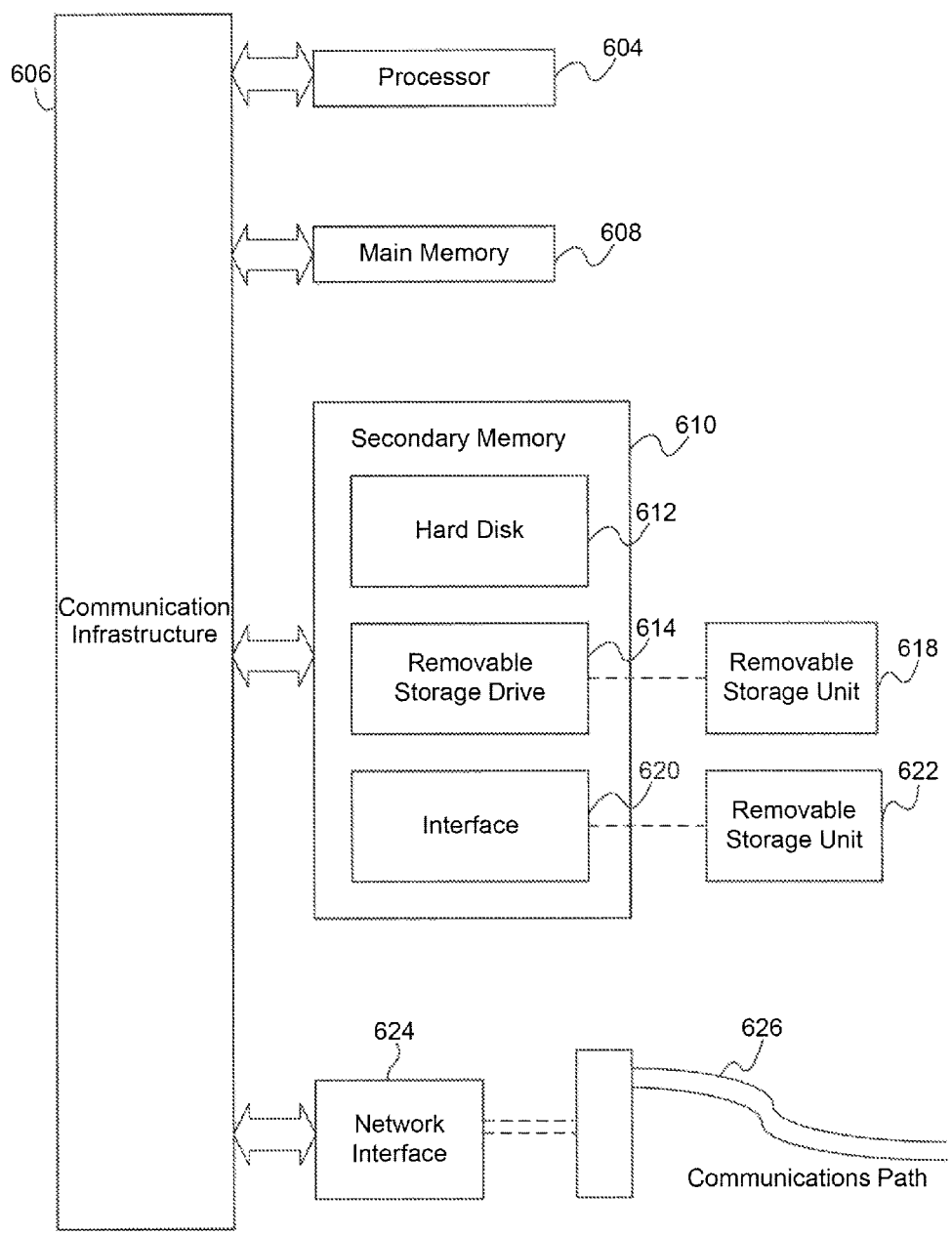
FIG. 6 is a diagram illustrating the architecture of a networked computer that can be used to implement an embodiment.

Various aspects of the present invention can be implemented by software, firmware, hardware, or a combination thereof. FIG. 6 illustrates an example computer system 600 in which the embodiments, or portions thereof, can be implemented as computer-readable code. For example, networked computer 106 carrying out method 500 can be implemented in computer system 600. Various embodiments of the invention are described in terms of this example computer system 600.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612 and/or a removable storage drive 614. Removable storage drive 614 may include a floppy disk drive, a magnetic tape drive, an optical disk drive, a flash memory, or the like. The removable storage drive 614 reads from and/or writes to removable storage unit 618 in a well-known manner. Removable storage unit 618 may include a floppy disk, magnetic tape, optical disk, etc. Removable storage unit 618 is read by and written to by removable storage drive 614. As will be appreciated by persons skilled in the relevant art(s) given the description herein, removable storage unit 618 includes a computer usable storage medium having stored therein computer software and/or data.

In alternative implementations, secondary memory 610 may include other means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620. Software and data are transferred via interface 620 from the removable storage unit 622 to communication infrastructure 606.

Computer system 600 also includes a network interface 624. Network interface 624 allows software and data to be transferred between computer system 600 and external devices. Network interface 624 may include a modem, an Ethernet interface (such as an Ethernet card), a communications port, a PCMCIA slot and card, or the like. Software and data transferred via network interface 624 are in the form of signals which may be electronic, electromagnetic, optical, or other signals capable of being received by network interface 624. These signals are provided to network interface 624 via a communications path 626. Communications path 626 carries signals and may be implemented using wire or cable, fiber optics, a phone line, a cellular phone link, an RF link or other communications channels. For example, communications path 626 may correspond to a communication network connected to the global Internet, and network interface 624 may be a network card configured to receive TCP/IP-based communications from such networks.

In this document, the term "computer readable storage medium" is used to generally refer to media such as removable storage unit 618, removable storage unit 622, and a hard disk installed in hard disk drive 612. Computer readable storage medium can also refer to one or more memories, such as main memory 608 and secondary memory 610. Either of main memory 608 and secondary memory 610 can be memory semiconductors (e.g. DRAMs, etc.). These computer program products are means for providing software to computer system 600.

Computer programs (also called computer control logic) are stored in main memory 608 and/or secondary memory 610. Computer programs may also be received via network interface 624. Such computer programs, when executed, enable computer system 600 to implement the embodiments as discussed herein. In particular, the computer programs, when executed, enable processor 604 to implement the processes of embodiments of the present invention, such as the steps in the method discussed above. Accordingly, such computer programs represent controllers of the computer system 600. Where embodiments are implemented using software, the software may be stored in a computer program product and loaded into computer system 600 using removable storage drive 614, interface 620, or hard drive 612.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

CONCLUSION

It is to be appreciated that the Detailed Description section, and not the Summary and Abstract sections, is intended to be used to interpret the claims. The Summary and Abstract sections may set forth one or more but not all example embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A method, performed by a computer connected to a network, for determining locations of a wireless access points, the method comprising:
    receiving a plurality of location data points from a plurality of mobile devices within signal range of a wireless access point, each location data point including data indicative of an estimated distance to the wireless access point;
    organizing the plurality of location data points into at least two clusters;
    organizing location data points within each of the organized clusters into one or more sessions based on a characteristic of the location data points;
    applying a rank qualifier to each of the organized clusters based at least in part on the sessions into the which the location data points were organized within the cluster; and
    determining the location of the wireless access point based on the organized and ranked clusters.

2. The method of claim 1, wherein applying a rank qualifier to the organized clusters comprises applying a rank qualifier to the organized clusters based on a measure of session diversity of an organized cluster.

3. The method of claim 2, wherein applying a rank qualifier to the organized cluster based on a measure of session diversity comprises applying a rank qualifier to the organized cluster based on a determined number of sessions associated with the organized cluster.

4. The method of claim 2, wherein applying a rank qualifier to an organized cluster based on a measure of session diversity comprises applying a rank qualifier to the organized cluster based on a number of location data points in the organized cluster.

5. The method of claim 1, wherein organizing location data points of an organized cluster into one or more sessions based on a characteristic of the location data points comprises organizing location data points of an organized cluster into one or more sessions based on a mobile device identifier associated with the location data points.

6. The method of claim 1, wherein organizing location data points of an organized cluster into one or more sessions based on a characteristic of the location data points comprises organizing location data points of an organized cluster into one or more sessions based on location characteristics associated with the location data points.

7. The method of claim 1, wherein receiving the location data points comprises receiving at least one location data point having global positioning system (GPS) location data.

8. The method of claim 1, wherein receiving the location data points comprises receiving wireless signal strength data from the plurality of mobile devices.

9. The method of claim 1, wherein organizing the location data points into clusters comprises organizing location data points into clusters based on distances between two or more location data points.

10. The method of claim 9, wherein organizing the location data points based on distances between the location data points comprises organizing location data points based on a minimum distance to a center of a cluster.

11. The method of claim 10, wherein organizing location data points based on a minimum distance to a center of a cluster comprises organizing location data points based on a minimum distance to a determined centroid of location data points within the cluster.

12. The method of claim 1, wherein determining the location of the wireless access point based on the organized clusters comprises determining the location of the wireless access point based on a set of location data points within a tanked cluster having an applied rank qualifier that indicates a highest rank.

13. A system for determining locations of wireless access points, comprising:
    a receiver configured to receive a plurality of location data points from a plurality of mobile devices within signal range of a wireless access point, each location data point including data indicative of an estimated distance to the wireless access point;
    a clusterer configured to:
        organize the plurality of location data points into at least two clusters, and
        group received location data points within each of the organized duster into one or more sessions based on a characteristic of the location data points;
    a rank applier configured to apply a rank qualifier to each of the organized clusters based at least in part on the sessions into the which the location data points were organized within the cluster; and a location determiner configured to determine a location of the wireless access point based on the organized and ranked clusters.

14. The system of claim 13, wherein the rank qualifier is based on a measure of session diversity of the organized clusters.

15. The system of claim 14, wherein the rank qualifier is based on a determined number of sessions associated with the organized clusters.

16. The system of claim 14, wherein the rank qualifier is based on the session with the highest number of location data points.

17. The system of claim 13, wherein the characteristic of the location data points comprises a mobile device identifier associated with the location data points.

18. The system of claim 13, wherein the characteristic of the location data points comprises location characteristics associated with the location data points.

19. The system of claim 13, wherein the location data points include a location data point having global positioning system (GPS) location data.

20. The system of claim 13, wherein the location data points include a location data point having wireless signal strength data.

21. The system of claim 13, wherein the clusterer is further configured to organize location data points into clusters based on distances between one or more of the location data points.

22. The system of claim 21, wherein the distances are based on a minimum measurement between a distance to a center of a cluster and to a closest location data point in the cluster.

23. The system of claim 22, wherein the center of the cluster is a determined centroid of location data points within the cluster.

24. The system of claim 13, wherein the location of the wireless access point is determined based on a cluster having an applied rank qualifier that indicates a highest rank.

25. A non-transitory computer readable storage medium having instructions stored thereon that, when executed by a computing device, cause the computing device to perform a method for determining locations of wireless access points, the method comprising:

receiving a plurality of location data points from a plurality of mobile devices within signal range of a wireless access point, each location data point including data indicative of an estimated distance to the wireless access point;

organizing the plurality of location data points into at least two clusters;

organizing location data points within each of the organized clusters into one or more sessions based on a characteristic of the location data points;

applying a rank qualifier to each of the organized clusters based at least in part on the sessions into the which the location data points were organized within the cluster; and determining the location of the wireless access point based on the organized and ranked clusters.

* * * * *